United States Patent
Warner et al.

(10) Patent No.: US 6,615,221 B2
(45) Date of Patent: Sep. 2, 2003

(54) SCALABLE TRANSPORT LAYER PROTOCOL FOR MULTIPROCESSOR INTERCONNECTION NETWORKS THAT TOLERATES INTERCONNECTION COMPONENT FAILURE

(75) Inventors: Craig W Warner, Addison, TX (US); Jay S. Tsao, Plano, TX (US)

(73) Assignee: Hewlett-Packard Development Company, LP., Houston, TX (US)

( * ) Notice: Subject to any disclaimer, the term of this patent is extended or adjusted under 35 U.S.C. 154(b) by 301 days.

(21) Appl. No.: 09/803,519

(22) Filed: Mar. 9, 2001

(65) Prior Publication Data

US 2002/0129029 A1 Sep. 12, 2002

(51) Int. Cl.[7] .............................. G06F 17/30; H02H 3/05
(52) U.S. Cl. ................. 707/104.1; 707/103 R; 707/102; 707/101; 707/100; 714/4
(58) Field of Search ................ 714/4; 707/100, 707/101, 102, 103 R, 104.1

(56) References Cited

U.S. PATENT DOCUMENTS

| | | | | |
|---|---|---|---|---|
| 5,309,437 A | * | 5/1994 | Perlman et al. | 370/85.13 |
| 5,500,860 A | * | 3/1996 | Perlman et al. | 370/85.13 |
| 5,524,254 A | * | 6/1996 | Morgan et al. | 395/800 |
| 5,802,319 A | * | 9/1998 | Faulk, Jr. et al. | 395/200.79 |
| 6,023,563 A | * | 2/2000 | Shani | 395/200.79 |
| 6,134,235 A | * | 10/2000 | Goldman et al. | 370/352 |
| 2001/0033554 A1 | * | 10/2001 | Ayyagari et al. | 370/328 |

OTHER PUBLICATIONS

Flavin, Cristian, Understanding Fault–Tolerant Distributed Systems, Communications of the ACM, Feb. 1991, vol. 34, No. 2, pp. 57–78.*

Birman et al., Reliable Communication in the Presence of Failures, ACM Transactions on Computer Science, vol. 5, No. 1, Feb. 1987, pp. 47–76.*

\* cited by examiner

*Primary Examiner*—Frantz Coby (57) ABSTRACT

A system and method for data communication in a multi-controller environment is disclosed. The system and method utilize a sequence number protocol to filter duplicate packets, adapt to transient errors, and to reroute data packets to avoid hardware malfunctions. The system and method further employ a transaction database to track packet communication in accordance with the sequence numbers. Moreover, the system and method may be implemented in hardware or software to provide a transparent transport layer to higher level hardware layers. The system and method utilize sequence number domains and a bridging protocol to reduce requirements associated with maintaining sequence number threads.

20 Claims, 4 Drawing Sheets

SCALABLE TRANSPORT LAYER PROTOCOL FOR MULTIPROCESSOR INTERCONNECTION NETWORKS THAT TOLERATES INTERCONNECTION COMPONENT FAILURE

BACKGROUND

High performance data processing systems have been developed to utilize multi-processor or multi-controller architectures. The primary motivation to utilize multi-processor configurations is a necessity of adapting to limitations associated with VLSI devices. Individual VLSI units inherently possess limited processing capacity. However, numerous VLSI units may be utilized in a distributed manner to create a system possessing substantially greater processing capacity.

Many high performance systems possess common characteristics. First, these multi-processor systems may utilize a shared-memory environment. Specifically, every processor's perspective of the memory structure is the same. To minimize latency in a shared memory structure, various cache coherency protocols are implemented. Additionally, these systems may contain similar functional sub-devices. The systems may comprise processors, processor agents, interconnect ASIC chips, memory controllers, and the like. Obviously, the processors provide the processing functionality of the system. The processor agents receive transaction requests from the processors, such as memory requests. The memory controllers manage communication to and from memory units, such as DRAM units, and the processor agents. Additionally, the interconnect units act as communication intermediaries between any other sub-units of the system.

Despite the clear advantages of these systems, the unique architectures entail several undesirable characteristics. First, the system presents high availability problems. In other words, the system may cease to function if an interconnect chip malfunctions or one of the wires connecting any of the sub-units fails. This is especially problematic for transient failures. For example, a transient failure may be caused by data corruption of a packet transmitted over a wire connection due to electrical noise. Alternatively, a transient failure may be caused by a hardware malfunction, such as power supply interruption to an interconnect chip that prevents communication across a particular link of the system. These multi-controller systems may require re-boot upon detection of a transient failure. For certain situations, re-booting of high performance multiprocessor systems is a cumbersome, time consuming process.

In the past, multi-processor systems have approached transient failures by utilizing slower signaling technology, i.e. the changes between signal states occur over longer periods. Also, slower signaling technology facilitates greater differences between high and low signal levels. Therefore, slower signaling technology is less susceptible to data corruption due to electrical noise or interference, implying a lower occurrence of transient errors. To provide greater data communication rates while utilizing slower signaling technology, greater pin counts have been implemented upon VLSI chips. However, physical constraints limit the ability to boost data communication rate through increasing VLSI pin counts.

SUMMARY OF THE INVENTION

It is anticipated that it will no longer be possible to achieve greater signaling rates through pin count augmentation. Accordingly, multi-processor systems will soon be required to utilize higher frequency signaling techniques to achieve greater communication data rates. Of course, the greater frequency signaling techniques create a greater probability of data corruption and hence transient failures.

Accordingly, the present invention is directed to a system and method to address the greater degree of unreliability of data communication related to high frequency signaling techniques in multi-controller environments. The system and method preferably provide a system and method that are robust against transient failures. The system and method preferably address transient failures in hardware so as to decrease latency of multi-controller systems in a scalable manner. Also, the system and method preferably facilitate data communication to pre-allocated memory with a multi-controller system that is robust against transient failures.

The system and method preferably implement a packet retransmission scheme to address transient failures. The system and method utilize a transaction database to track the transmission and reception of data packets. The transaction database preferably comprises sequence numbers associated with the last packet received from source sub-units and sequence numbers associated with the last packet sent to destination sub-units. The system and method utilize the sequence numbers to track the successful delivery of data packets. In the present system and method, a source sub-unit may preferably send a data packet to a destination sub-unit with a sequence number. If the data packet is successfully transmitted to the destination sub-unit, the sub-unit responds by transmitting an acknowledgment containing the sequence number. The source sub-unit may preferably implement a timer mechanism associated with the transmit data packet. If the source sub-unit does not receive an acknowledgment packet corresponding to the proper sequence number stored in the transaction database within a predetermined time, the source sub-unit assumes that a transient failure has occurred and re-transmits the data packet.

The system and method preferably adapt to transient failures associated with hardware failures, such as broken wires or power failures. The system and method further utilize the timing mechanism and re-transmission process in a successive manner. If a successive number of transmissions occurs without receipt of an acknowledgment packet, the system and method may isolate the source of the transient failure to take corrective action, such as developing alternative routing to bypass a hardware failure.

Additionally, the system and method preferably utilize the transaction database and related sequence numbers to filter duplicate packets. The system and method preferably further provide a transport layer to transparently manage data communication for higher level protocol layers.

The system and method preferably utilize an addressing architecture that is scalable. The system and method utilize domain addressing for data transmission in a multi-controller system to reduce memory requirements of the transaction and routing databases. The system and method preferably utilize bridge units that exist in two distinct domains to facilitate communication across the domains. Specifically, the bridges exist in two different domains— their own and whatever the parent or source or destination domain. For example, a bridge may belong either the source domain and the intermediate domain or an intermediate domain and a destination domain.

Multi-controller systems exhibit better performance and their cache coherency protocols are simpler if packet sources have preallocated space at destinations. Processor agents may preallocate resources in memory controllers for memory requests, and memory controllers may preallocate resources in processor agents for cache coherency recalls and in other memory controllers to implement other reliable memory protocols. By implementing a transport protocol with sequence numbers as outlined, cache coherency protocols may preferably utilize preallocation at the endpoints because of the filtering property of the transport layer protocol. Moreover, multi-controller systems exhibit superior performance characteristics upon minimization of latency within the systems. The system and method reduce latency by implementing the previously discussed functionality in hardware to provide superior data communication performance.

DETAILED DESCRIPTION

Figure 1A:
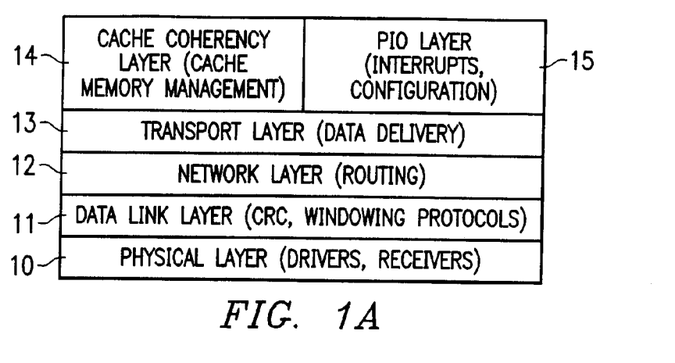
FIG. 1A illustrates an exemplary protocol layer hierarchy including a transport layer providing data communication support to cache coherency and PIO layers.

Turning toward the drawing, FIG. 1A illustrates an exemplary system layer diagram that sets forth a preferred arrangement of system functionality employing the present invention. FIG. 1A is provided to illustrate preferred relationships between various system layers and the present invention.

The lower system layers depict typical communication layers. For example, physical layer 10 implements the physical signaling of data across system connections via drivers and receivers. Data link layer 11 implements low-level data transmission protocols to adapt to data corruption. Network layer 12 is responsible for routing of packets through the system via routing tables, source vector routing, and/or the like. Any number of schemes or mechanisms may be utilized to implement the physical, data link, and network layers by persons possessing ordinary skill in the art. These system layers need not be discussed to any appreciable degree for an understanding of the present invention.

Transport layer 13 is the layer that assumes primary responsibility for reliable delivery of data through the system. Transport layer 13 preferably implements message sequence numbering. Transport layer 13 is thereby enabled to filter duplicate packets. Moreover, transport layer 13 preferably implements directed retry after time-out periods. Similarly, transport layer 13 preferably adapts data transmission to transient failures within the system.

Transport layer 13 enables high level layers such as cache coherency layer 14 and processor input/output (PIO) layer 15 to efficiently operate in a multi-controller environment. Cache coherency layer 14 may preferably manage tracking and managing of processor-write-back caches and managing coherency tags in main memory. PIO layer 15 may be utilized to implement interrupts and system configuration accesses. Moreover, these and other high level layers are enabled by transport layer 13 to operate transparently to the difficulties encountered by transient failures and hardware failures within the system.

Figure 1B:
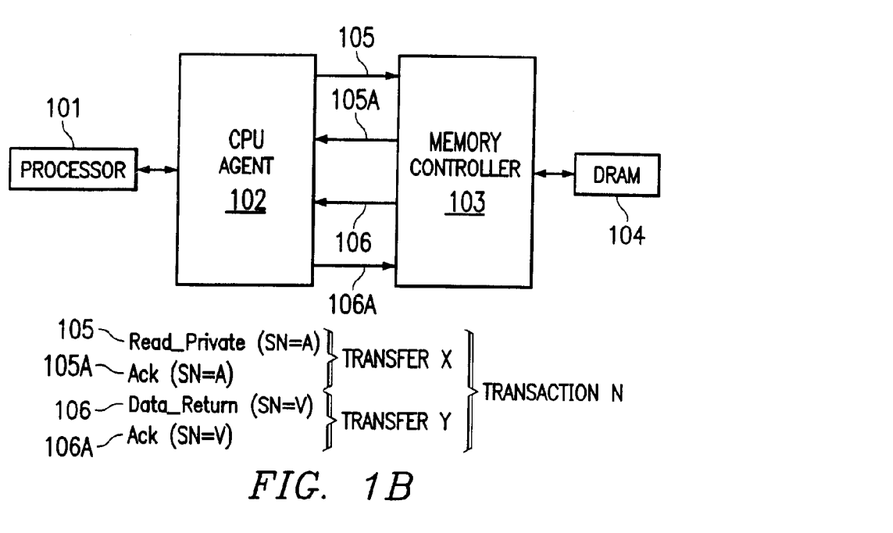
FIG. 1B illustrates a signaling sequence in a simplified exemplary multi-controller system.

FIG. 1B illustrates a simplified multi-controller system implementing the present invention. The system of FIG. 1B comprises processor 101, CPU agent 102, DRAM 104, and memory controller 103. Additionally, FIG. 1B illustrates an exemplary signaling sequence associated with the present invention. This exemplary signaling sequence illustrates a transaction involving a read of a memory location in DRAM 104 by processor 101. Processor 101 begins the transaction by communicating with CPU agent 102. In response, CPU agent 102 generates and transmits read_private packet 105 containing sequence number A to memory controller 103. Memory controller 103 responds by echoing ACK packet 105A containing sequence number A to CPU agent 102. Read_private 105 and the ACK packet 105A form transfer X. Moreover, memory controller 103 communicates with DRAM 104 to obtain the value of data stored at the memory address of DRAM 204 as specified in read_private 105 packet. Memory controller constructs and transmits data_private return packet 106 containing the retrieved data value and sequence number V to CPU agent 102. CPU agent 102 responds by generating and transmitting ACK packet 106A containing sequence number V to memory controller 103. Data_return packet 106 and ACK packet 106A form transfer Y. Transfers X and Y form a single transaction N. Finally, CPU agent communicates the retrieve value to processor 101. When CPU agent 102 transmits another packet (other than an ACK packet), it will use sequence number B. Similarly, when memory controller 103 issues another packet (other than an ACK packet), it will utilize sequence number W.

It shall be appreciated that the preceding signaling associated with the transport layer protocol is preferably implemented in hardware, not simply in software executed utilizing the processors. The implementation in hardware is advantageous for several reasons. First, the hardware approach greatly reduces latency within a multi-controller system. Reduction of latency is a critical performance issue for high performance multi-controller systems which are intended to provide optimal processing capacity. Secondly, implementation of the transport layer in hardware also allows integration of other system level functionality upon the component level. For example, cache coherency protocols are preferably implemented at the hardware level to achieve their greatest utility.

By integrating the transport layer at the hardware layer, the cache coherency functionality may utilize the lower level hardware transport layer to transparently operate without independently adapting to transient errors. For example, microprocessors exhibit improved performance and their cache coherency protocols are significantly simplified, if packet sources are able to establish pre-allocated space at destinations. For example, processor agents may pre-allocate resources in memory controllers for memory requests and memory controllers may pre-allocate resources in processor agents for cache coherency recalls to implement other reliable memory protocols. By implementing a transport protocol with sequence numbers as outlined, a cache coherency protocol can use pre-allocation at the endpoints utilizing the filtering property of the transport layer protocol. This type of pre-allocation optimization is extremely difficult to accomplish without implementing a transport layer protocol which filters duplicate packets. Likewise, the present invention facilitates maintenance of order of PIO traffic. Accordingly, many higher level hardware protocols and functions may be simplified by the present invention.

It shall be appreciated that the preceding system and signaling is a simplified description of the present invention. An actual implementation of the present invention may comprise substantially more processors, CPU agents, memory controllers, DRAM, and other hardware arranged into any number of potential configurations. Moreover, the packets may comprise any number of additional fields, such as routing information, error detection values, packet age values, and/or the like. Moreover, the data transfer may comprise more than a single value per transfer.

The preceding signaling sequence assumes that each message is transmitted and received properly without being subject to a transient error or hardware failure. The system and method preferably utilize the ACK packets to detect and adapt to transient errors and hardware failures. If an ACK packet is not received, it is assumed that a packet has been lost or corrupted within the system. Accordingly, the system and method may attempt to retransmit the lost packet. Retransmission will preferably occur a discrete number of times. If retransmission is not successful, the system and method may employ a failover protocol to transmit the packet via an alternative route, as will be discussed in greater detail below.

Figure 2:
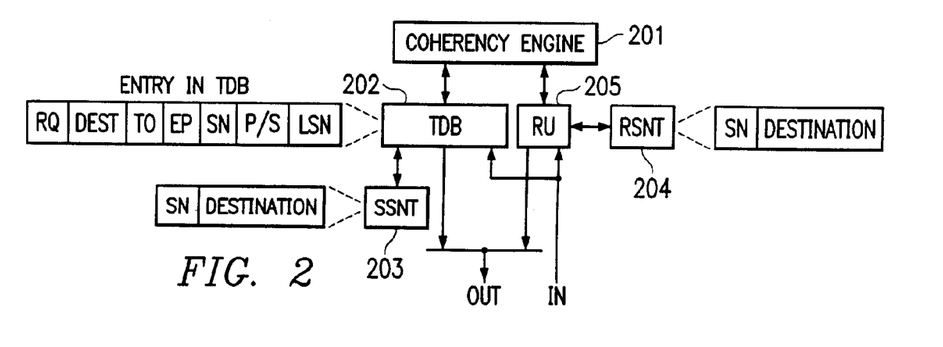
FIG. 2 illustrates a coherency engine interfacing with a preferred embodiment comprising sequence number hardware.

FIG. 2 illustrates sequence number hardware in communication with a coherency unit. This assemblage of components may be employed with or incorporated within various components of a multi-controller system, such as a CPU agent or a memory controller. First, the unit contains coherency engine 201. Coherency engine 201 manages the coherency protocols, such as requests for data from memory addresses. Coherency engine 201 may begin a transaction by issuing a read_private transaction request to the transaction database (TDB) 202. TDB 202 creates entry in its database. TDB 202 creates a table entry consisting of a plurality of fields, such as request information type (RQ), destination address (Dest), timeout information (TO), endpoint sequence number (EP SN), primary or secondary path indicator (P/S), local sequence number (LSN), and/or the like. The table entry creation may be performed by logical instructions encoded into an ASIC design to place the requisite information into memory or registers resident upon the ASIC. Alternatively, the table entry creation task may be implemented via logical instructions executed by a processor. When the message is to be transmitted, TDB 202 consults the next entry in the sending sequence number table (SSNT) 203 to ascertain the next sending sequence number to be associated with the request packet. Similarly, this task may be implemented via ASIC encoded instructions or processor based instructions operating with memory and/or a register. The actual message may be transmitted over a line by an appropriate driver unit. When an acknowledgment (ACK) packet containing the used sending sequence number is received, the entry is freed from TDB 202. TDB 202 may also clear all transactions with a used sending sequence number lower than the number communicated in the ACK packet, since it implies the completion of previously issued sequence numbers.

The endpoint sequence number is preferably utilized for multi-sequence number domain systems. The endpoint sequence number is useful for alternative routing to overcome transient failures. Similarly, the P/S indicator facilitates alternate routing. For example, if an entry in TDB 202 times out (utilizing the TO field), the P/S bit may be flipped and another packet may be issued. The P/S value may be indicated in the reissued packet, thereby causing the system to route the packet through an alternative path avoiding a transient or hardware failure. Of course, the P/S field is not necessarily limited to a single bit for alternate pathing. The P/S field is equally applicable to multiple alternative paths by employing a larger P/S field.

Similarly, the hardware unit contains receive unit (RU) 205. When RU 205 receives a packet from a destination, RU 205 refers to receive sequence number table (RSNT) 204. Like SSNT 203, RSNT 204 may be implemented via ASIC encoded instructions or processor based instructions operating with memory and/or a register. RU 205 verifies that the sequence number in the received packet matches the expected sequence number contained in RSNT 204 for the specific destination. If the sequence numbers match, the message is forwarded to the TDB and an ACK packet containing the received sequence number is transmitted to the originating component. RU 205 may be implemented in any number of ways. Of course, RU 205 unit may comprise a receiver to accept signals via lines from other system components. RU 205 may comprise or utilize an ALU or other logic unit to perform the sequence number comparison. Also, RU 205 may comprise logical instructions encoded in ASIC design or logical instructions executed via a processor to retrieve expected sequence numbers from an RSNT, which may be implemented as memory and/or registers associated with the device. Similarly, RU 205 may comprise other instructions to monitor for ACK packets from other components.

Figure 3:
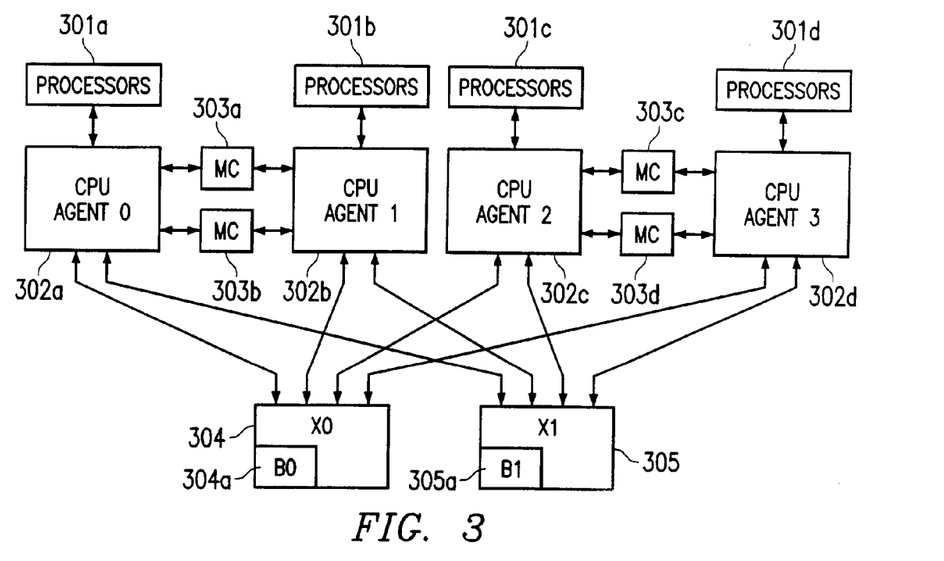
FIG. 3 illustrates an exemplary topology of a multi-controller system implemented as a single sequence number domain.

FIG. 3 illustrates a more complicated exemplary system implementing the present invention. The system is a single sequence number domain, as will be explained in greater detail below. The system comprises processors 301a–301d. Processors 301a–301d preferably implement system processing utilizing write-back caches.

System 300 further comprises CPU agents 302a–302d. CPU agents 302a–302d are preferably directly connected to the respective processors to receive memory requests. CPU agents 302a–302d form request packets from the CPU memory requests for transmission to the memory controller associated with the physical address identified within the memory request. The CPU agents may perform other system functionality, such as recalls requests (requests to a processor to relinquish control over certain cache lines).

Also, the system further comprises memory controllers (MC) 303a–303d. Memory controllers 303a–303d preferably interface with DRAMs to retrieve or modify data stored upon main memory. Memory controllers 303a–303d communicate stored data to other controllers or agents. Memory controllers 303a–303d preferably track which processors possess read/write access to the cache lines associated with the individual memory controllers.

Interfaces 304 and 305 are interface chips providing physical connections between the components and routing functionality. Interfaces 304 and 305 implement the physical layer, data layer, and networking layer of the system. This illustrative embodiment contains two interface chips connected to each message component. Accordingly, duplicate paths are created between components to accommodate transient errors, line failures, components failures, and/or the like. In such systems, performance may be affected by sequence number sizing. For example, sequence numbers may be implemented utilizing 32 bits, 8 bits, or any other number. System performance will be optimized, if the system ensures that a device does not receive two different transactions containing the same sequence number. Accordingly, specific system design considerations must be examined to determine the optimal sequence number size. If a system is to be designed so that high numbers of packets are generated, the sequence number data representation should preferably be selected to comprise a large number of bits. By doing so, duplicate packets are avoided, since a specific sequence number will not be reused until system aging dispenses with a preceding packet comprising the same sequence number. However, if a lower bit representation is chosen, the system should preferably wait a transaction lifetime before switching paths during retransmission.

In order to track expected sequence numbers, each CPU agent or memory controller preferably tracks two sequence numbers for every other CPU agent or memory controller in the same sequence number domain, i.e. the last sequence number sent to a specific component and the last sequence number received from a specific component. Although it is possible to utilize a single sequence number approach, the use of two sequence number threads is preferred to clear entries in the respective database at an earlier point to allow addition of new entries. So, in a system with n message sources, each message source utilizing this preferred embodiment would maintain 2*(n−1) sequence number threads to track the requisite sequence numbers.

A single sequence number domain is the conceptual architecture of components defined by a common set of sequence threads shared on a single interconnect component. It shall be appreciated that a component, implementing this threading embodiment for a system comprising 1025 controllers with 32 bit sequence numbers, would require significant resources to be dedicated to maintaining the thread sequences. Utilizing the preferred embodiment memory requirements, 64K would be allocated to sequence number threading upon each controller. Clearly, this is an excessive requirement even for large VLSI designs.

Figure 4:
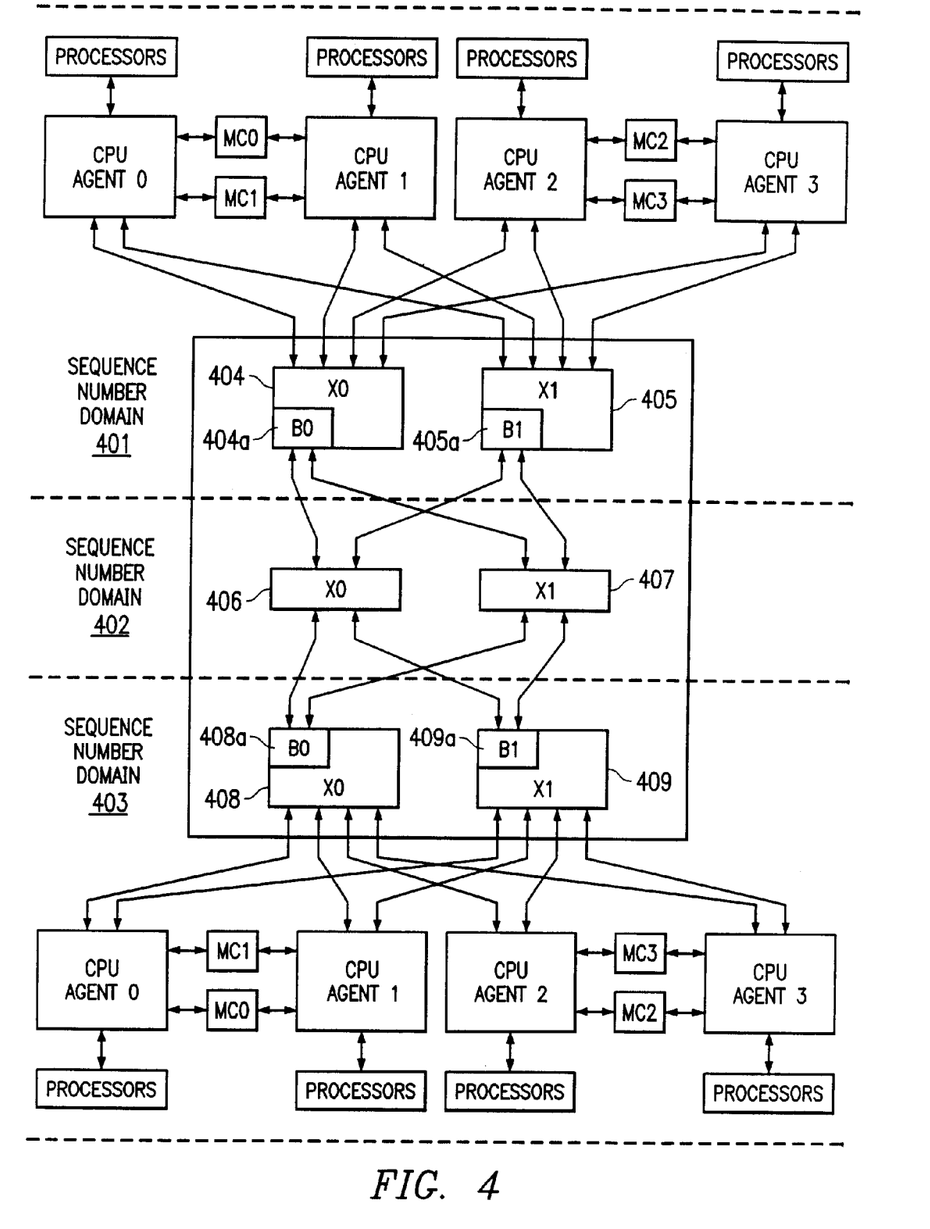
FIG. 4 illustrates an exemplary topology of a multi-controller system implemented as multiple sequence number domains.

Accordingly, it is a further aspect of the present invention to provide a bridging component and bridging protocol to allow implementation in a scalable manner. Bridging involves creating distinct sequence number domains connected by a bridging unit. FIG. 4 illustrates a simplified exemplary implementation utilizing a bridging component. The system set forth in FIG. 4 comprises three distinct sequence number domains, 401, 402, and 403.

The sequence number domains 401, 402, 403 comprise interfaces 404–405, 406–407, and 408–409, respectively. Additionally, interfaces 404 and 405 comprise bridging units 404a and 405a. Likewise, interfaces 408 and 409 comprise bridging units 408a and 409a. Bridging units 404a, 405a, 408a, and 409a belong to two distinct domains to facilitate data communication between domains. For example, interface unit 404 belongs to sequence number domain 401 and sequence number domain 402. Similarly, bridging unit 408a belongs to sequence number domain 402 and 403. Interfaces 406 and 407 do not comprise bridging units. These components do not play a role in the transport layer. Instead, these component simply implement the physical, data link, and network layers of the system, thereby connecting the respective bridging units.

Figure 5:
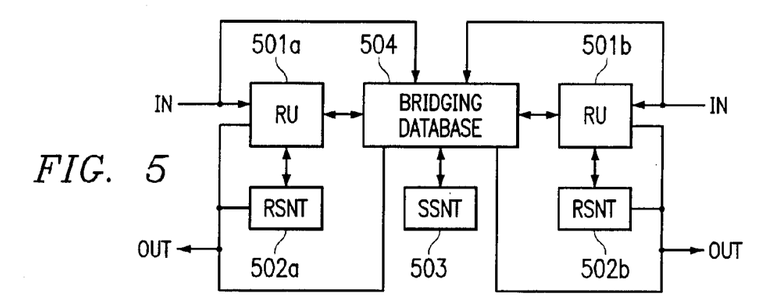
FIG. 5 illustrates a preferred embodiment of sequence number bridging hardware.

FIG. 5 illustrates a preferred hardware implementation of the bridging units. Bridging hardware comprises two receive units 501a and 501b for each sequence number domain. Bridging hardware further comprises two RSNTs 502a and 502b. Bridging hardware further comprises SSNT 503. Also, bridging hardware comprises bridging database 504. Bridging database 504 is similar to the transaction database as set forth in FIG. 2. However, bridging database 504 tracks messages transmitted to and received from the two sequence number domains. For example, when a packet is received from one side of bridging database 504, it issues an ACK message in the reverse direction. Bridging database 504 consults the SSNT to retrieve the next sequence number for the next bridging unit or destination component for the intermediate sequence number domain. Bridging database 504 utilizes the receive sequence number to create a new entry in the transfer database. Bridging database 504 would then transmit the packet via the out wire.

Figure 6:
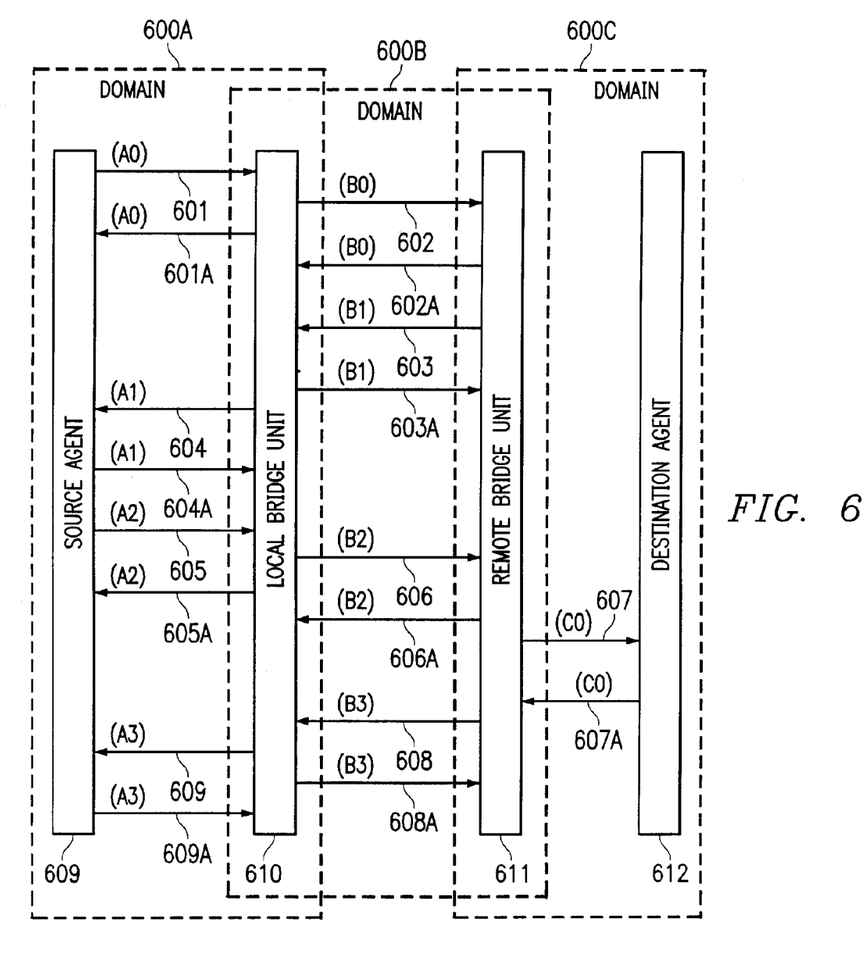
FIG. 6 illustrates a preferred signaling sequence utilizing a bridging method.

FIG. 6 illustrates an exemplary set of signaling associated with a bridging protocol. All messages between source agent 609 and local bridge unit 610 occur in sequence number domain 600A. Messages between local bridge unit 610 and remote bridge unit 611 occur in sequence number domain 600B. Likewise, messaging between remote bridge 611 unit and destination agent 612 occurs in sequence number domain 600C.

The exemplary bridged communication transaction begins when source agent 609 sends memory request 601 with sequence number A0 to local bridge unit 610. Local bridge unit forwards the request to remote bridge unit 611 utilizing message 602 with sequence number B0. In a substantially simultaneous manner, local bridge unit 610 also sends ACK 601A with sequence number A0 to source agent 609. The remote bridge unit 611 sends ACK 602A with sequence number B0 to local bridge unit 610. Remote bridge unit 611 also sends remote info packet 603 with sequence number B1 to local bridge unit 610. Remote info packet 603 comprises the sequence number that is expected by destination agent 612 for the next packet sent by remote bridge unit 611. Local bridge unit 610 responds with ACK 603A with sequence number B1. Local bridge unit 610 passes this remote information to source agent 609 with packet 604 (sequence number A1) which is acknowledged by source agent ACK packet 604A with sequence number A1.

At this point, sufficient signaling has occurred to forward the actual memory request to the final destination. This preliminary signaling occurs for several reasons, including obtaining the remote information (expected sequence number stored at the remote agent) to enable a failover protocol to adapt to a transient failure. The failover protocol will be discussed in greater detail below.

After obtaining the remote information, the source agent transmits packet 605 with sequence number A2 to local bridge unit 610. Packet 605 indicates that the request may be forwarded to the final destination, since the remote information has been obtained. Local bridge unit 610 sends ACK packet 605A with sequence number A2. Local bridge unit 610 forwards the read_private packet as packet 606 (sequence number B2) to remote bridge unit 611, which is acknowledged by ACK packet 606A (sequence number B2). Similarly, remote bridge unit 611 forwards the read_private packet as packet 607 (sequence number C0), which is acknowledged by ACK packet 607A (sequence number C0). At this point, remote bridge unit initiates the end-to-end acknowledgment to notify source agent 609 that the read_ private request has been received by transmitting packet 608. The end-to-end acknowledgment is forwarded by local bridge unit 610 to source agent 609 via packet 609 (sequence number A3). Of course, packets 608 and 609 are followed by ACK packets 608A (sequence number B3) and 609A (sequence number A3), respectively.

Recalling from the signaling sequence discussed in connection with FIG. 2, the immediately preceding signaling sequence is analogous to transfer X. The entire transaction will be completed when destination agent 612 repeats the preceding bridging protocol to send the actual data_return to source agent 609.

It shall be appreciated that the bridging protocol may be implemented across any number of CPU agents, memory controllers, and bridging units. The advantage of the bridging protocol is the facilitation of memory requests and response across a large number of sequence domains. By dividing systems into a plurality of sequence number domains, the memory requirements placed upon controller devices due to sequence number streams may be greatly reduced. Accordingly, the present invention enables a reliable transport protocol for systems that may contain thousands of processors and memory controllers.

Figure 7:
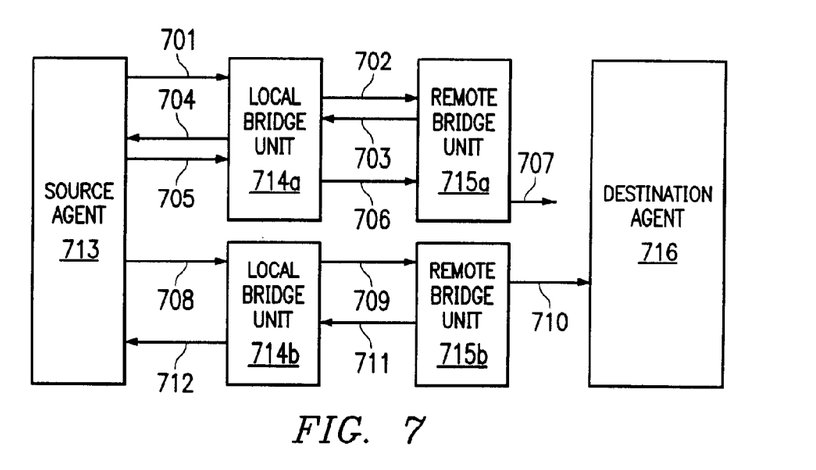
FIG. 7 illustrates a preferred signaling sequence associated with a failover method.

FIG. 7 illustrates a signaling sequence associated a preferred embodiment of the failover protocol. The system implementing the failover protocol is similar to the system set forth in FIG. 6. However, this system contains two local bridge units 714a and 714b, two remote bridge units 715a and 715b to provide alternate pathing to destination agent 716 from source agent 713, and vice versa. The signaling sequence begins in the same manner as the signaling sequence set forth in FIG. 6 (accordingly some steps, including the ACK packet steps, have been omitted for the sake of brevity): (a) source agent sends memory request 701; (b) local bridge agent 714a forwards memory request 702; (c) remote bridge unit 715a responds with remote info packet 703 containing destination sequence number; (d) local bridge unit 714a sends packet 704 containing destination sequence number; (e) source agent 713 sends forward packet 705 indicating that the request packet may be forwarded to the destination; (f) local bridge agent 714a forwards request packet in message 706.

At this point, the signaling sequence differs. Remote bridge unit 715a forwards the request packet via message 707 to destination agent. However, message 707 does not reach destination agent 716 due to a transient error, such as electrical noise, temporary device malfunction, power loss, wire failure, or the like. For a period of time, source agent 713 waits for the appropriate end-to-end acknowledgment packet. However, this packet never arrives, since destination agent 716 did not receive message 707. Source agent 713 times the pendency associated with attending the end-to-end acknowledgment packet. After a time out period expires, source agent 713 reissues the memory request packet via message 708 utilizing another path, in this case via local bridge unit 714b. Source agent 713 incorporates the receive remote info (comprising the expected sequence number), so that destination agent 716 will recognize the new packet as a valid request, rather than an erroneous duplicate packet. Thereafter, the alternate path is successfully completed utilizing messages 709, 710, 711, and 712.

It shall be appreciated that time out mechanisms may be implemented in other portions of the system. For example, a timeout mechanism may be implemented in local bridge unit 714a. Accordingly, local bridge unit 714a could cause retransmission of the message previously contained in message 706 via a new message to be alternatively routed through remote bridge unit 715b. It shall be further appreciated that retransmission may occur across more than one alternate path, if several transient errors occur. Similarly, the present system and method may attempt retransmission upon a single route among a plurality of routes an arbitrary number of times before selecting an alternate route.

What is claimed is:

1. A multiprocessor system for ensuring reliable data communication in a system comprising a first plurality of components comprising:
   sending sequence number table for generating and storing a series of sending sequence numbers; each of the sending sequence numbers is associated with a prior message sent to a component of the first plurality of components;
   transaction database unit for creating a database entry corresponding to a transaction request, wherein the transaction request is associated with a destination address;
   means for retrieving a next sending sequence number by consulting the sequence number table; and
   means for transmitting a transaction message comprising the next sending sequence number and the destination address.

2. The multiprocessor system of claim 1 further comprising:
   receive sequence number table for storing a series of receive sequence numbers, wherein each of the receive sequence numbers is associated with a prior received message from a component of the first plurality of components; and
   receive unit which includes:
      means for receiving a message, wherein the received message comprises a received sequence number;
      means for retrieving an expected receive sequence number by consulting the receive sequence number table; and
      means for comparing the received sequence number and the expected sequence number, wherein the received message is discarded if the received sequence number and the expected sequence number do not match.

3. The multiprocessor system of claim 1 wherein the transaction database unit further comprises a means for monitoring incoming messages for an acknowledgment packet comprising a previously sent sending sequence number.

4. The multiprocessor system of claim 3 wherein means for transmitting retransmits the transaction message, if the acknowledgment packet is not received within a predetermined amount of time.

5. The multiprocessor system of claim 3 wherein means for transmitting retransmits the transaction message to be routed via an alternate path, if the acknowledgment packet is not received within a predetermined amount of time.

6. The multiprocessor system of claim 1 wherein the first plurality of components are disposed in one sequence number domain of a plurality of sequence number domains, and wherein the transaction message is routed to a bridge unit if the destination address is not associated with a component disposed in said one sequence number domain.

7. The multiprocessor system of claim 6 wherein the transaction database unit comprises a means for monitoring incoming messages for an end-to-end acknowledgment, if the destination address is not associated with a component disposed in said one sequence number domain.

8. The multiprocessor system of claim 1 wherein the transaction request is a pre-allocation request.

9. The multiprocessor system of claim 1 wherein the transaction request is a cache protocol request.

10. A method, for ensuring reliable data communication in a multiprocessor system, the method comprising the steps of:

receiving a transaction request associated with a destination address;

retrieving a next sending sequence number;

creating a database entry corresponding to the transaction request;

transmitting a transaction message comprising the destination address and the next sending sequence number; and monitoring incoming messages for an acknowledgment packet comprising the previously sent sending sequence number.

11. The method of claim 10 further comprising the step of retransmitting the transaction message, if the acknowledgment packet is not received within a predetermined amount of time.

12. The method of claim 10 further comprising the step of retransmitting the transaction message to be routed via an alternate path, if the acknowledgment packet is not received within a predetermined amount of time.

13. The method of claim 12 wherein routing via an alternate path occurs via source vector routing.

14. The method of claim 10 wherein the transmitting step including the sub-step of:

causing the transaction message to be routed to a bridging unit, if the destination address is not associated with a sequence number domain associated with a component performing said transmitting step.

15. The method of claim 14 wherein the destination address is not associated with the sequence number domain associated with said component performing said transmitting step, the method further comprising the step of:

receiving remote information comprising a next sequence number expected by a component associated with the destination address.

16. The method of claim 15 further comprising the step of:

monitoring incoming messages for an end-to-end acknowledgment packet from a component associated with the destination address.

17. The method of claim 16 further comprising the step of:

retransmitting a message via an alternate route, if the end-to-end acknowledgment is not received with a predetermined amount of time.

18. A bridging unit for facilitating communication between a first and second sequence number domains, comprising:

first receive unit for receiving messages for the first sequence number domain;

second receive unit for receiving messages for the second sequence number domain;

sending sequence number table comprising a series of sending sequence numbers, wherein sequence numbers are associated with prior packets sent to components contained in either the first or second sequence number domain;

bridging database unit, comprising:

means for creating a database entry in response to a received message from a component disposed in one of the first or second sequence number domains;

means for retrieving a next sending sequence number;

means for transmitting a transaction message comprising information from the received message and the next sending sequence number to a component disposed in the other sequence number domain.

19. The bridging unit of claim 18 further comprising first receive sequence number table comprising a first series of receive sequence numbers, wherein each sequence number of said first series is associated with a prior message received from a component in the first sequence number domain; and second receive sequence number table comprising a second series of receive sequence numbers, wherein each sequence number of said second series is associated with a prior message received from a component in the second sequence number domain.

20. The bridging unit of claim 19 wherein the first receive unit comprises:

means for receiving a message comprising a receive sequence number from a component disposed in said first sequence number domain;

means for retrieving a next expected receive sequence number associated with the component;

means for comparing the received receive sequence number with the expected receive sequence number, wherein the message is discarded if the received receive sequence number and the expected receive sequence number do not match.

* * * * *